(12) United States Patent
Okano et al.

(10) Patent No.: US 7,932,945 B2
(45) Date of Patent: Apr. 26, 2011

(54) SOLID-STATE IMAGING DEVICE

(75) Inventors: Masafumi Okano, Kanagawa (JP); Satsuki Kamogawa, Fukuoka (JP)

(73) Assignee: Sony Corporation, Tokyo (JP)

( * ) Notice: Subject to any disclaimer, the term of this patent is extended or adjusted under 35 U.S.C. 154(b) by 581 days.

(21) Appl. No.: 11/959,698

(22) Filed: Dec. 19, 2007

(65) Prior Publication Data
US 2008/0158402 A1 Jul. 3, 2008

(30) Foreign Application Priority Data

Dec. 27, 2006 (JP) ................. 2006-352561

(51) Int. Cl.
*H04N 3/14* (2006.01)
*H04N 5/335* (2006.01)
(52) U.S. Cl. .................... 348/294; 348/296; 348/308
(58) Field of Classification Search .................... 348/294
See application file for complete search history.

(56) References Cited

U.S. PATENT DOCUMENTS

| | | | |
|---|---|---|---|
| 2005/0104985 A1* | 5/2005 | Abe et al. ...................... | 348/308 |
| 2005/0128327 A1* | 6/2005 | Bencuya et al. ............... | 348/308 |
| 2006/0066750 A1* | 3/2006 | Henderson et al. ............ | 348/362 |
| 2006/0175536 A1* | 8/2006 | Kim et al. .................... | 250/208.1 |
| 2006/0238632 A1* | 10/2006 | Shah ............................. | 348/296 |

FOREIGN PATENT DOCUMENTS

JP 2004-165686 6/2004

* cited by examiner

*Primary Examiner* — Sinh Tran
*Assistant Examiner* — Christopher K Peterson
(74) *Attorney, Agent, or Firm* — SNR Denton US LLP

(57) ABSTRACT

A solid-state imaging device includes a sharing pixel block having k (where k is a natural number other than 1) pixel transistors corresponding to n (where n is a natural number other than 1) pixels and a row-selection circuit configured to select the pixel transistors every row in the sharing pixel block using logic of an address signal and a timing signal. In this solid-state imaging device, in a case of a 1/n row decimation operation in which a signal is read every n rows, the row-selection circuit simultaneously performs shutter operations for n rows corresponding to the k pixel transistors included in the sharing pixel block using an input of a simultaneous-shutter-operation signal.

12 Claims, 15 Drawing Sheets

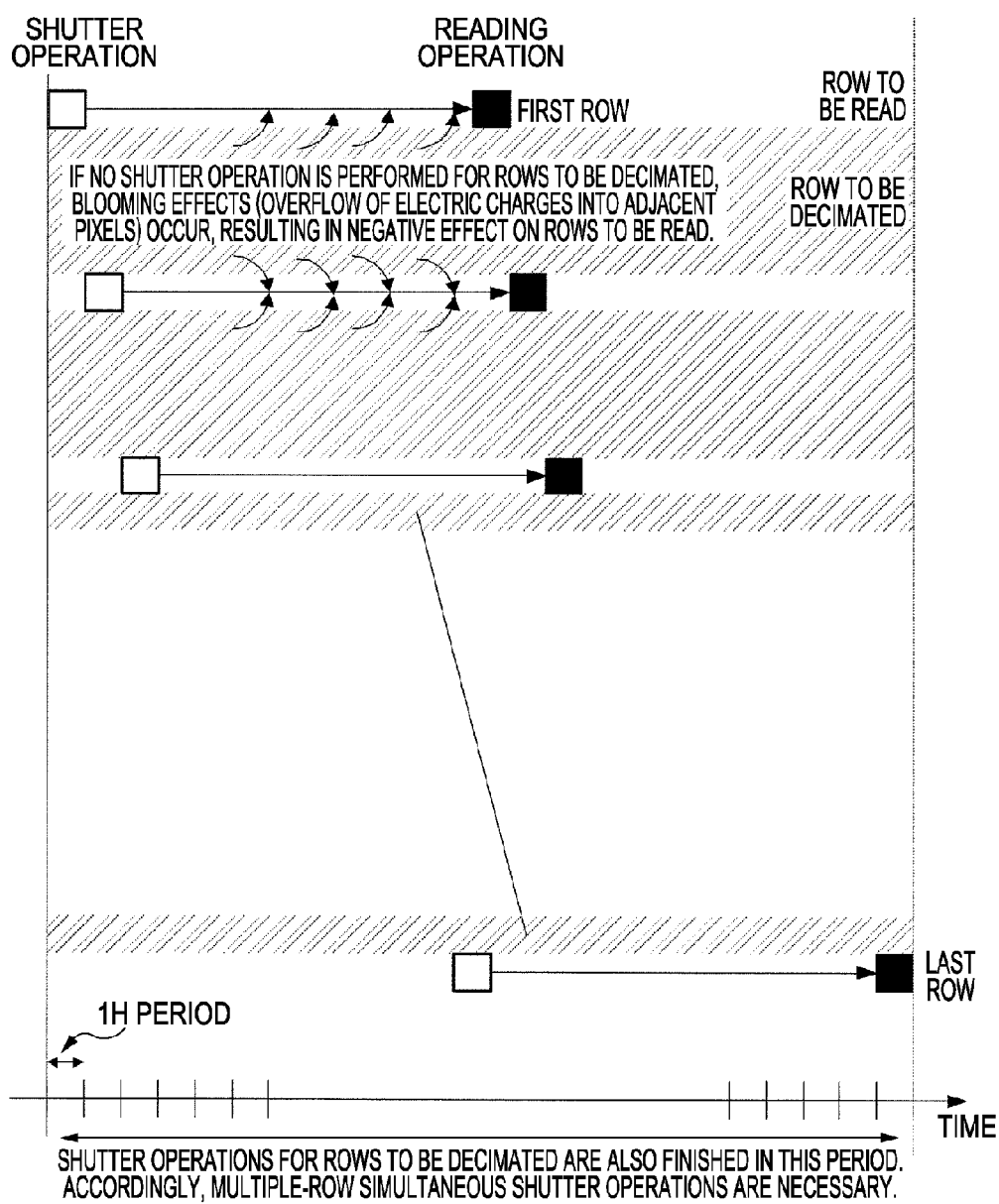

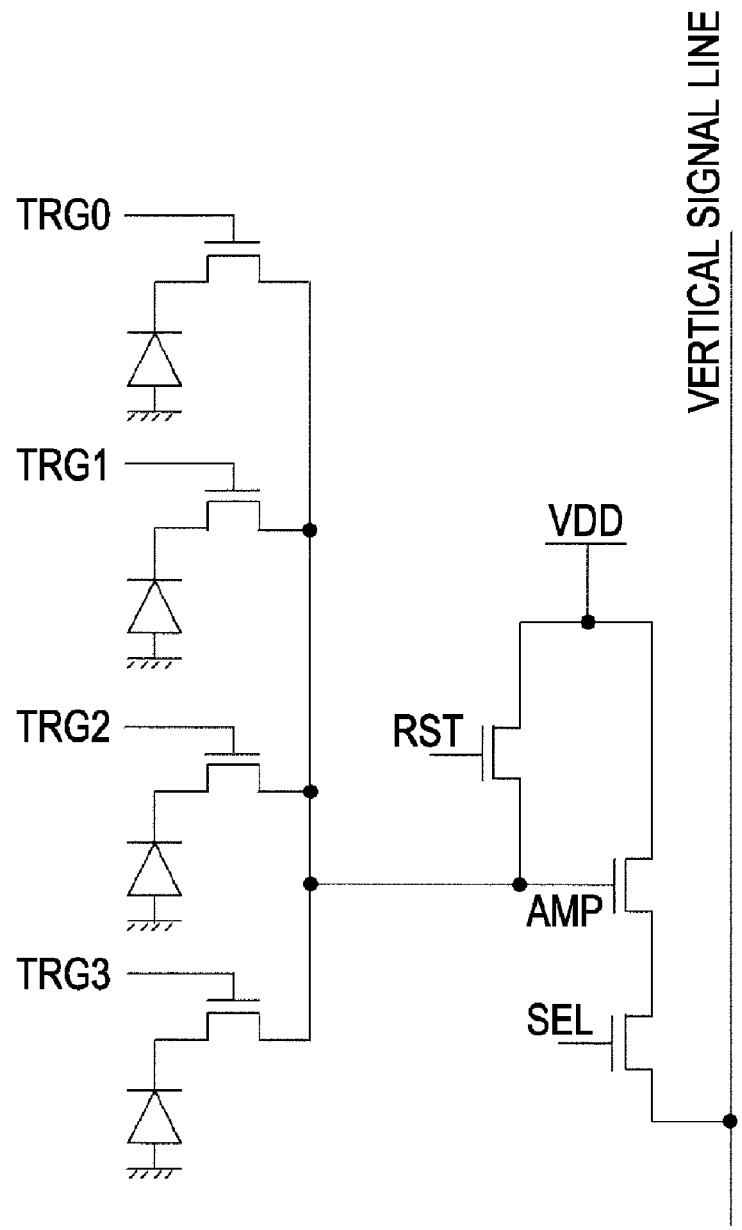
Prior Art    FIG. 15

SOLID-STATE IMAGING DEVICE

CROSS REFERENCES TO RELATED APPLICATIONS

The present invention contains subject matter related to Japanese Patent Application JP 2006-352561 filed in the Japanese Patent Office on Dec. 27, 2006, the entire contents of which are incorporated herein by reference.

BACKGROUND OF THE INVENTION

1. Field of the Invention

The present invention relates to a solid-state imaging device including a sharing pixel block having a plurality of pixel transistors, and more particularly, to a solid-state imaging device configured to realize operations of reading rows performed concurrently with decimation of certain number of rows.

2. Description of the Related Art

Recently, the increase of the number of pixels in complementary metal oxide semiconductor (CMOS) image sensors has been quickly promoted. At the same time, high-speed operations of reading pixel signals, which take advantages of CMOS image sensors, have drawn attention. The two things conflicting with each other, the increase of the number of pixels and high-speed reading operations, are demanded.

As one solution for the above-described two things, operations of reading rows performed concurrently with decimation, which take an advantage in that CMOS image sensors can access any pixel therein, have been broadly used (see Japanese Unexamined Patent Application Publication No. 2004-165686). For example, referring to FIG. 13, in a case of 1/5 decimation, in an operation sequence, an operation of reading a pixel signal obtained from one row and an operation of decimating four rows are repeated. In other words, in the sequence, an operation of reading a pixel signal obtained from one row, an operation of decimating four rows, and another operation of reading a pixel signal obtained from one row, etc., are performed in this order. By using this sequence, only signals obtained from 1/5 of the total number of rows in a pixel unit can be read.

For example, in cases of digital still cameras, application examples of decimating operations include monitoring in liquid crystal monitors. When monitoring is performed, the resolution of images displayed on liquid crystal monitors does not have to be high, but operations performed in the monitoring are necessary to be performed at low power consumption. Accordingly, in such a case, decimation operations in sensors have a positive effect on the monitoring. Additionally, since the number of rows to be read is decreased using the decimation operations, high-speed reading operations can be realized in the monitoring, which is also a positive effect.

Methods of decimation of signals can be roughly classified into two types of methods: a method of one type is a method of decimating signals in units of rows; and a method of the other type is a method of decimating signals in units of columns. The present invention relates to a V-decoder circuit configured to realize decimation operations that are performed in units of rows as the above-described example. Hereinafter, "decimation" refers to decimation operations performed in units of rows.

SUMMARY OF THE INVENTION

Decimation operations in the related art have a disadvantage related to shutter operations for rows to be decimated. Although no operation of reading pixel signals is performed for rows to be decimated, shutter operations are necessary for the rows to be decimated. The reason for this is, regardless of whether rows are to be decimated or read, photodiodes in pixels are exposed to light. If no shutter operation is performed, electric charges flow from the photodiodes, whereby pixels for which no shutter operation is performed have negative effects (blooming effects) on pixels adjacent thereto.

FIG. 14 is a schematic diagram describing the blooming effects. Referring to FIG. 14, electric charges flowing from photodiodes in rows to be decimated have negative effects on pixel signals obtained from rows to be read.

For example, in CMOS image sensors used in mobile phones, high image quality in cases where reading operations performed concurrently with decimation are performed has not been so necessary. Accordingly, shutter operations for rows to be decimated have not been performed in most cases. Additionally, in CMOS image sensors for other applications, in order to cope with blooming effects, for example, a V-decoder for shutter operations for rows to be decimated is newly added, or continuous shutter operations are performed for rows to be decimated (referring to FIG. 15, a voltage H is applied to TRGs 0 to 3 and RST all the time, thereby keeping discharging electric charges from photodiodes). However, such methods have a disadvantage, for example, in terms of chip size or reliability.

Another disadvantage is a pixel configuration. Recently, in view of, for example, aperture ratio, a pixel configuration in which a plurality of pixels share transistors has been broadly employed, for example, as Japanese Unexamined Patent Application Publication No. 11-126895 discloses.

FIG. 15 shows an example of the pixel configuration, and in the pixel configuration, four pixels share an RST transistor, an AMP transistor, and a SEL transistor. In such a configuration in which four pixels share one RST transistor, in particular, when decimation operations for odd rows are performed, addressing to RST transistors becomes complicated, and the simultaneous performance of shutter operations for a plurality rows is necessary. Accordingly, this places an enormous load on sensor control unit (SCU) designers.

The more the expectations of high-speed operations in CMOS image sensors raise in the future, the higher the image quality of the CMOS image sensors is necessary. Solid-state imaging sensor devices in the related art are not sufficiently capable of performing reading operations performed concurrently with decimation of arbitrary number of rows in the configuration in which shares of transistors are realized in units of a plurality of pixels. This leads to deterioration in image quality.

According to an embodiment of the present invention, there is provided a solid-state imaging device including a sharing pixel block having k (where k is a natural number other than 1) pixel transistors corresponding to n (where n is a natural number other than 1) pixels and a row-selection circuit configured to select the pixel transistors every row in the sharing pixel block using logic of an address signal and a timing signal. In this solid-state imaging device, in a case of a 1/n row decimation operation in which a signal is read every n rows, the row-selection circuit simultaneously performs shutter operations for n rows corresponding to the k pixel transistors included in the sharing pixel block using an input of a simultaneous-shutter-operation signal.

In the embodiment of the present invention, in the solid-state imaging device including the sharing pixel block, when the 1/n row decimation operation in which a signal is read every n rows is performed, shutter operations for n rows corresponding to the k pixel transistors included in the sharing pixel block are simultaneously performed. Accordingly, the amounts of blooming effects on signals each of which is obtained every n target rows to be read, which are caused by rows adjacent to the target rows to be read, can be substantially equalized.

Furthermore, a solid-state imaging device according to an embodiment of the present invention includes a sharing pixel block having k (where k is a natural number other than 1) pixel transistors corresponding to 4n (where n is a natural number) pixels and a row-selection circuit configured to select the pixel transistors every row in the sharing pixel block using logic of an address signal and a timing signal. In this solid-state imaging device, in a case of a 1/4n row decimation operation in which a signal is read every 4n rows, the row-selection circuit simultaneously performs shutter operations for 4n rows corresponding to the k pixel transistors included in the sharing pixel block using an input of a simultaneous-shutter-operation signal.

A solid-state imaging device according to an embodiment of the present invention includes a sharing pixel block having k (where k is a natural number other than 1) pixel transistors corresponding to 4(n−1) (where n is a natural number other than 1) pixels and a row-selection circuit configured to select the pixel transistors every row in the sharing pixel block using logic of an address signal and a timing signal. In this solid-state imaging device, in a case of a 1/(4n−3) row decimation operation in which a signal is read every (4n−3) rows, the row-selection circuit simultaneously performs shutter operations for 4(n−1) rows corresponding to the k pixel transistors included in the sharing pixel block using an input of a simultaneous-shutter-operation signal.

A solid-state imaging device according to an embodiment of the present invention includes a sharing pixel block having k (where k is a natural number other than 1) pixel transistors corresponding to 4(n−1) (where n is a natural number other than 1) pixels and a row-selection circuit configured to select the pixel transistors every row in the sharing pixel block using logic of an address signal and a timing signal. In this solid-state imaging device, in a case of a 1/(4n−3) row decimation operation in which a signal is read every (4n−3) rows, the row-selection circuit simultaneously performs shutter operations for 8(n−1) rows corresponding to 2 k pixel transistors corresponding to two sharing pixel blocks using an input of a simultaneous-shutter-operation signal.

A solid-state imaging device according to an embodiment of the present invention includes a sharing pixel block having k (where k is a natural number other than 1) pixel transistors corresponding to 4(n−1) (where n is a natural number other than 1) pixels and a row-selection circuit configured to select the pixel transistors every row in the sharing pixel block using logic of an address signal and a timing signal. In this solid-state imaging device, in a case of a 1/(4n−3) row decimation operation in which a signal is read every (4n−3) rows, the row-selection circuit simultaneously performs shutter operations for 12(n−1) rows corresponding to 3 k pixel transistors corresponding to three sharing pixel blocks using an input of a simultaneous-shutter-operation signal.

A solid-state imaging device according to an embodiment of the present invention includes a sharing pixel block having k (where k is a natural number other than 1) pixel transistors corresponding to 4(n−1) (where n is a natural number other than 1) pixels and a row-selection circuit configured to select the pixel transistors every row in the sharing pixel block using logic of an address signal and a timing signal. In this solid-state imaging device, in a case of a 1/(4n−2) row decimation operation in which a signal is read every (4n−2) rows, the row-selection circuit simultaneously performs shutter operations for 4(n−1) rows corresponding to the k pixel transistors included in the sharing pixel block using an input of a simultaneous-shutter-operation signal.

A solid-state imaging device according to an embodiment of the present invention includes a sharing pixel block having k (where k is a natural number other than 1) pixel transistors corresponding to 8(n−1) (where n is a natural number other than 1) pixels and a row-selection circuit configured to select the pixel transistors every row in the sharing pixel block using logic of an address signal and a timing signal. In this solid-state imaging device, in a case of a 1/(4n−2) row decimation operation in which a signal is read every (4n−2) rows, the row-selection circuit simultaneously performs shutter operations for 8(n−1) rows corresponding to the k pixel transistors included in the sharing pixel block using an input of a simultaneous-shutter-operation signal.

A solid-state imaging device according to an embodiment of the present invention includes a sharing pixel block having k (where k is a natural number other than 1) pixel transistors corresponding to 4(n+1) (where n is a natural number other than 1) pixels and a row-selection circuit configured to select the pixel transistors every row in the sharing pixel block using logic of an address signal and a timing signal. In this solid-state imaging device, in a case of a 1/(4n−2) row decimation operation in which a signal is read every (4n−2) rows, the row-selection circuit simultaneously performs shutter operations for 4(n+1) rows corresponding to the k pixel transistors included in the sharing pixel block using an input of a simultaneous-shutter-operation signal.

A solid-state imaging device according to an embodiment of the present invention includes a sharing pixel block having k (where k is a natural number other than 1) pixel transistors corresponding to 4(n−1) (where n is a natural number other than 1) pixels and a row-selection circuit configured to select the pixel transistors every row in the sharing pixel block using logic of an address signal and a timing signal. In this solid-state imaging device, in a case of a 1/(4n−1) row decimation operation in which a signal is read every (4n−1) rows, the row-selection circuit simultaneously performs shutter operations for 4(n−1) rows corresponding to the k pixel transistors included in the sharing pixel block using an input of a simultaneous-shutter-operation signal.

A solid-state imaging device according to an embodiment of the present invention includes a sharing pixel block having k (where k is a natural number other than 1) pixel transistors corresponding to 8(n−1) (where n is a natural number other than 1) pixels and a row-selection circuit configured to select the pixel transistors every row in the sharing pixel block using logic of an address signal and a timing signal. In this solid-state imaging device, in a case of a 1/(4n−1) row decimation operation in which a signal is read every (4n−1) rows, the row-selection circuit simultaneously performs shutter operations for 8(n−1) rows corresponding to the k pixel transistors included in the sharing pixel block using an input of a simultaneous-shutter-operation signal.

A solid-state imaging device according to an embodiment of the present invention includes a sharing pixel block having k (where k is a natural number other than 1) pixel transistors corresponding to 4(n+1) (where n is a natural number other than 1) pixels and a row-selection circuit configured to select the pixel transistors every row in the sharing pixel block using logic of an address signal and a timing signal. In this solid-state imaging device, in a case of a 1/(4n−1) row decimation operation in which a signal is read every (4n−1) rows, the row-selection circuit simultaneously performs shutter operations for 4(n+1) rows corresponding to the k pixel transistors included in the sharing pixel block using an input of a simultaneous-shutter-operation signal.

In each of the solid-state imaging devices according to the embodiments of the present invention described above, when the decimation operation in which a signal is read every plurality of rows is performed, shutter operations for rows corresponding to a plurality of pixel transistors included in the sharing pixel block are simultaneously performed. Accordingly, the amounts of blooming effects on target rows to be read, which are caused by rows adjacent to the target rows to be read, can be substantially equalized.

Thus, according to the embodiments of the present invention, in a case where a decimation operation is performed, the amounts of blooming effects on target rows to be read can be equalized. As a result, the blooming effects can be reliably suppressed in signal processing of a subsequent stage, thereby largely contributing to the realization of a high-quality image even in a case where a decimation operation is performed. Additionally, the number of rows to be read can be selected with flexibility even when transistor-sharing pixels are used.

BRIEF DESCRIPTION OF THE DRAWINGS

FIG. 14 is a diagram describing blooming effects; and

FIG. 15 is a circuit diagram of the configuration of a sharing pixel block in a CMOS image sensor.

DESCRIPTION OF THE PREFERRED EMBODIMENTS

Embodiments of the present invention will be described below with reference to the accompanying drawings. Each of the embodiments relates to a solid-state imaging device including a sharing pixel block shown in FIG. 15 that includes a plurality of pixel transistors corresponding to a plurality of pixels. In the solid-state imaging device, a decimation operation of reading a signal every predetermined number of rows is performed. Here, regarding an expression of decimation, 1/n row decimation (where n is a natural number) refers to a decimation operation of reading a signal every n rows. In the embodiments, for simplicity of description, a configuration shown in FIG. 15, in which one sharing pixel block includes four pixels, is described as an example.

First Embodiment

Figure 1:
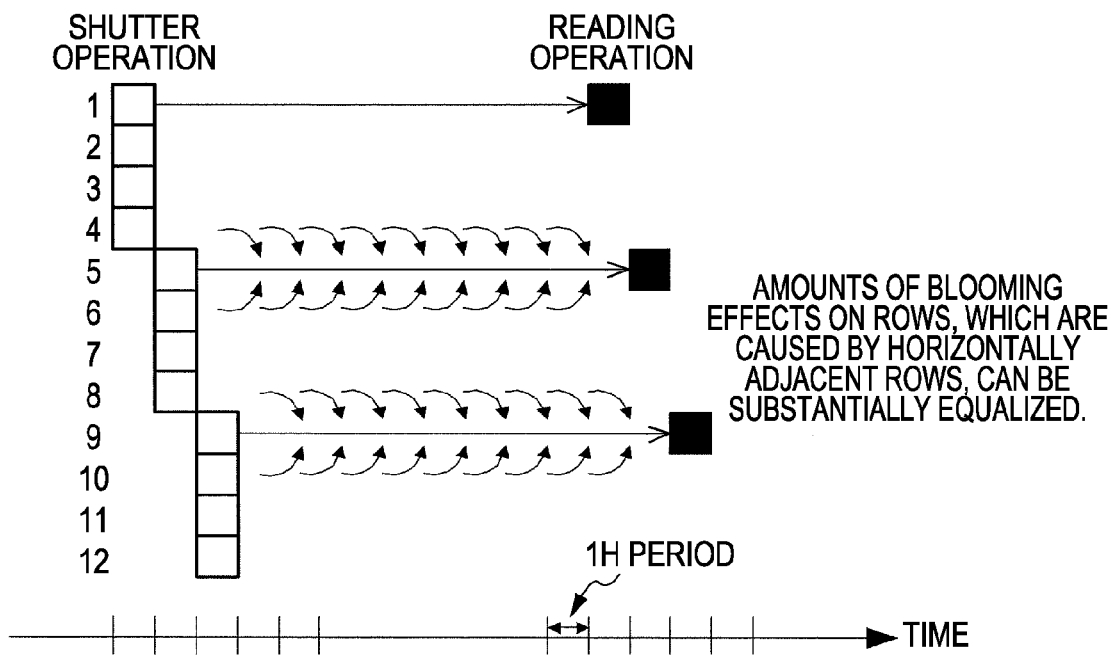
FIG. 1 is a diagram describing an operation sequence of 1/4 row decimation.

FIG. 1 is a diagram describing an operation sequence of 1/4 row decimation. In a case of 1/4n row decimation (where n is a natural number), i.e., 1/4 row decimation, 1/8 row decimation, 1/12 row decimation, etc., one row every 4n rows is read. In this case, shutter operations for 4n rows are simultaneously performed.

That is, as shown in FIG. 1, in a case of 1/4 row decimation, shutter operations for first to fourth rows are simultaneously performed in a certain H period (horizontal transfer period), and then, shutter operations for fifth to eighth rows are performed in the next H period, followed by shutter operations for ninth to twelfth rows. In this manner, simultaneous shutter operations for four rows are sequentially performed. After the simultaneous shutter operations are performed, electric charges are accumulated in photodiodes for an appropriate time. Then, signals obtained from the first row, the fifth row, the ninth row, etc., are sequentially read. By employing this operation sequence, the amounts of blooming effects, each of which is caused by rows adjacent to a target row to be read, on target rows can be equalized.

Since the amounts of blooming effects on target rows to be read are equalized, the blooming effects can be stably removed in signal processing of a subsequent stage. As a result, the occurrence of a horizontal stripe in an image can be prevented to obtain an excellent image quality.

Figure 2:
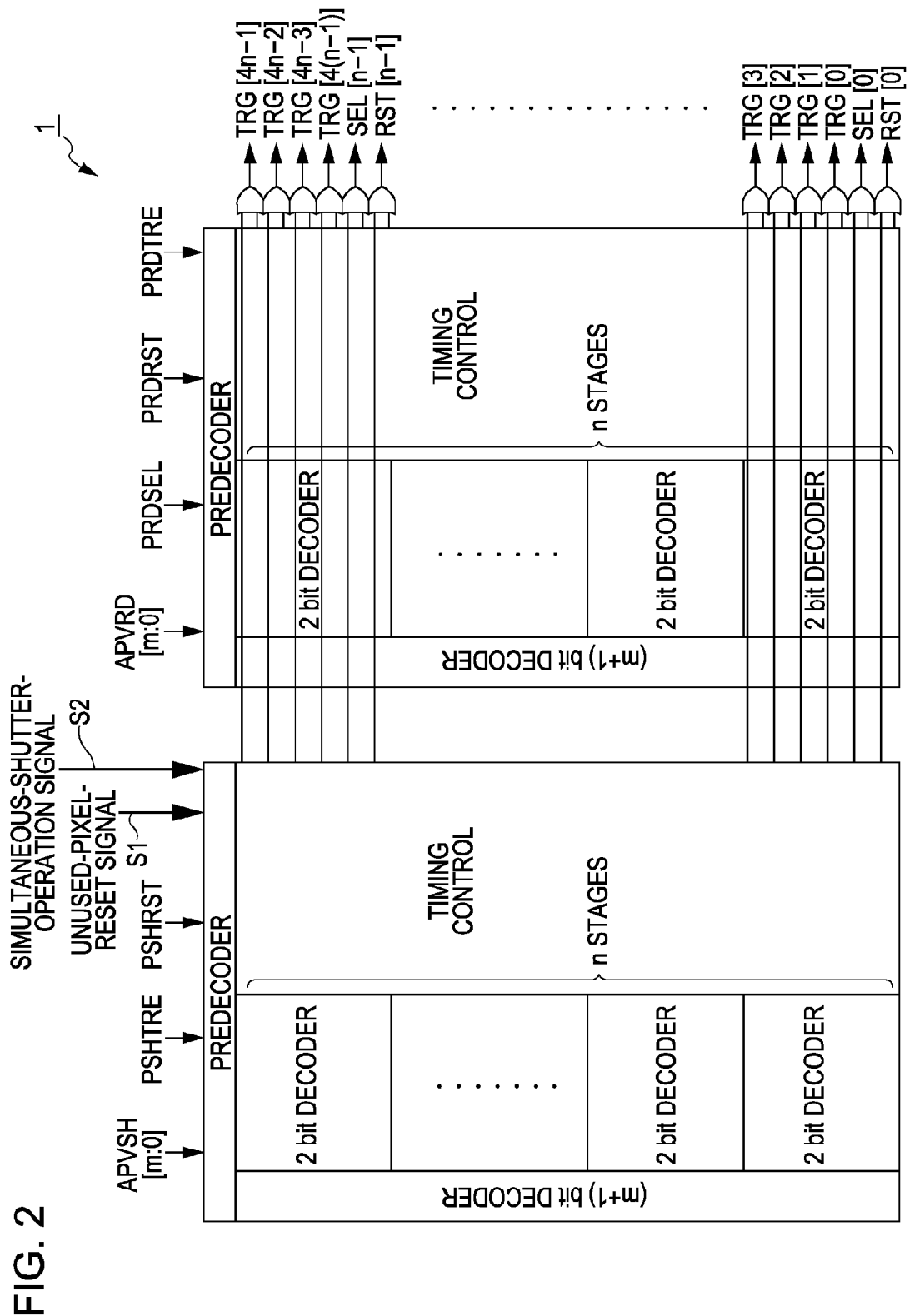
FIG. 2 is a diagram of a configuration example of a circuit (row-selection circuit) in a solid-state imaging device that realizes a decimation operation according to an embodiment of the present invention.

FIG. 2 is a diagram of a configuration example of a circuit (row-selection circuit) in a solid-state imaging device that realizes a decimation operation according to a first embodiment of the present invention. That is, an (m+1)-bit shutter row address APVSH is input to a row-selection circuit 1 shown in FIG. 2 and decoded to obtain $2^{m+1}$-bit addresses in a predecoder. The OR of the decoded addresses, an RST timing signal PSHRST used in a case where shutter operations are performed, and a TRG timing signal PSHTRE used in a case where shutter operations are performed, is calculated to control shutter operations for specified pixel rows.

Furthermore, an (m+1)-bit read row address APVRD is input to the row-selection circuit 1 and decoded to obtain $2^{m+1}$-bit addresses in the predecoder. The OR of the decoded addresses, an RST timing signal PRDRST used in a case where reading operations are performed, a TRG timing signal PRDTRE used in a case where reading operations are performed, and a SEL timing signal PRDSEL used in a case where reading operations are performed, is calculated to control reading operations for specified pixel rows.

In the row-selection circuit 1, an unused-pixel-reset signal S1 for instructing simultaneous control of a plurality of pixels, and a simultaneous-shutter-operation signal S2 for instructing simultaneous performance of shutter operations for a plurality of pixels are input to the predecoder to realize operations according to the first embodiment.

Second Embodiment

Figure 3:
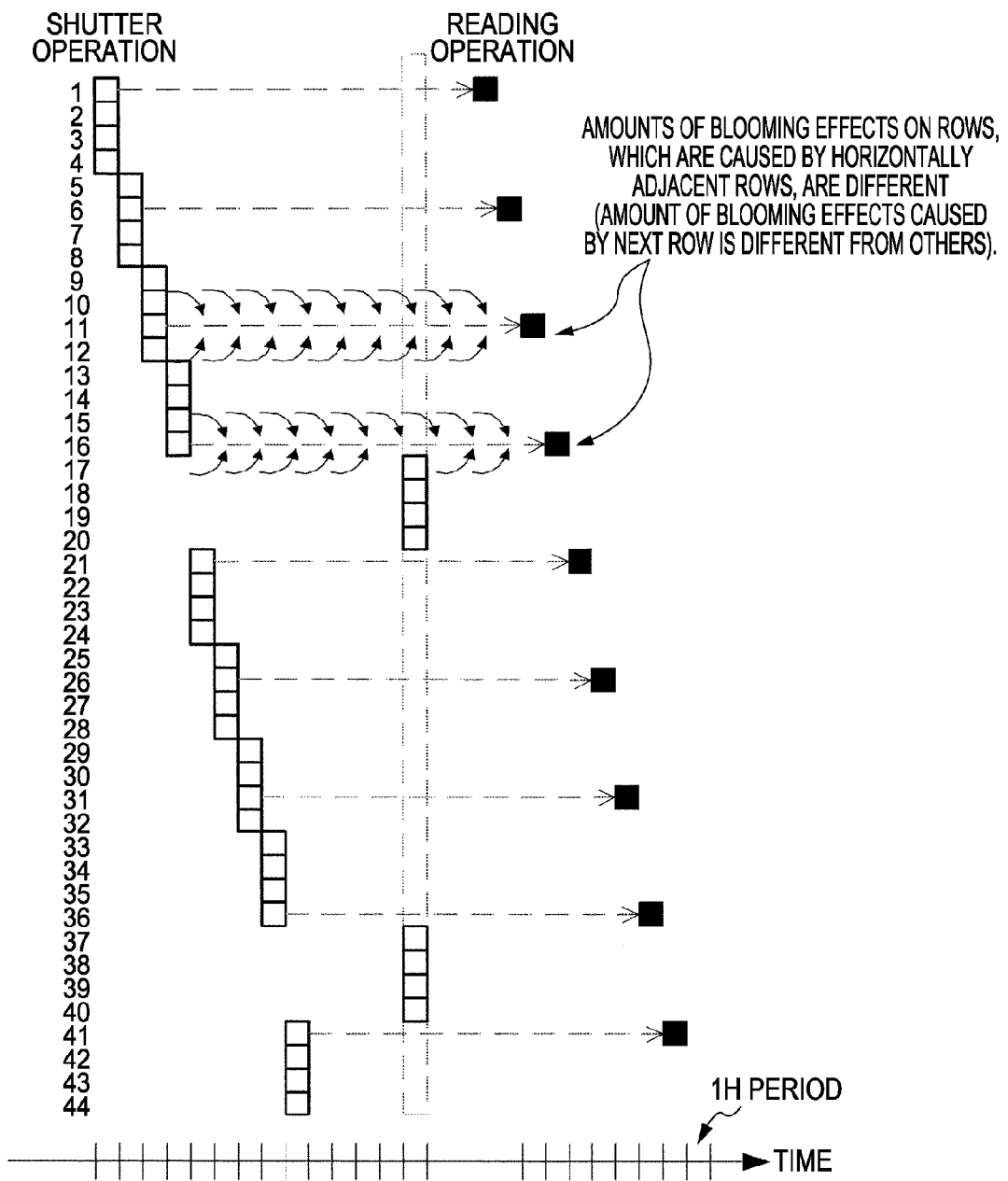
FIG. 3 is a diagram describing a first operation sequence of 1/5 row decimation.

FIG. 3 is a diagram describing a first operation sequence of 1/5 row decimation. In a case of 1/(4n−3) row decimation (where n is a natural number other than 1), i.e., 1/5 row decimation, 1/9 row decimation, 1/13 row decimation, etc., one row every (4n−3) rows is read.

Here, a case of 1/(4n−3) row decimation for n=1 is equivalent to 1/1 row decimation, i.e., a case of reading all pixels, and is omitted.

Shutter operations form a pattern for a group of rows whose number is the least common multiple (LCM) (4n−3, 4(n−1)). This pattern includes 4(n−1)-row simultaneous shutter operations. Shutter operations for 4(n−1) rows not including any rows to be read in one group are simultaneously performed with shutter operations for 4(n−1) rows not including any rows to be read in another group, for example, in a non-selection period (a reading period for pixels that are not used for an image output). One row every (4n−3) rows is read as a reading operation performed concurrently with decimation.

In an example shown in FIG. 3, since the equation LCM (5, 4)=20 is obtained, twenty rows form one pattern. That is, each of 4(n−1)-row simultaneous shutter operations (four-row simultaneous shutter operations because of n=2 in the example shown in FIG. 3) is performed for first to fourth rows, fifth to eighth rows, ninth to twelfth rows, or thirteenth to sixteenth rows. Then, shutter operations for seventeenth to twentieth rows are simultaneously performed with shutter operations for thirty-seventh to fortieth rows, fifty-seventh to sixtieth rows, etc. In other words, by using this sequence, the shutter operations can be performed also for the rows to be decimated.

However, with this operation sequence, there is a possibility that the differences of the amounts of blooming effects on rows to be read, which are caused by rows horizontally adjacent to the rows to be read, arise between rows to be read (sixteenth, twenty-first, thirty-sixth, and forty-first rows in the example shown in FIG. 3) that are adjacent to rows for which the simultaneous shutter operations for any rows not including rows to be read are performed, and rows to be read (first, sixth, eleventh, twenty-sixth, and thirty-first rows) that are not adjacent to rows for which the simultaneous shutter operations for rows not including any rows to be read are performed.

In an example of the circuit configuration of a solid-state imaging device according to a second embodiment, referring to the circuit diagram shown in FIG. 2, the unused-pixel-reset signal S1 and the simultaneous-shutter-operation signal S2 for 4(n−1) rows are input to the row-selection circuit 1 to realize the shutter operations for a group of 4(n−1) rows not including any rows to be read.

Third Embodiment

Figure 4:
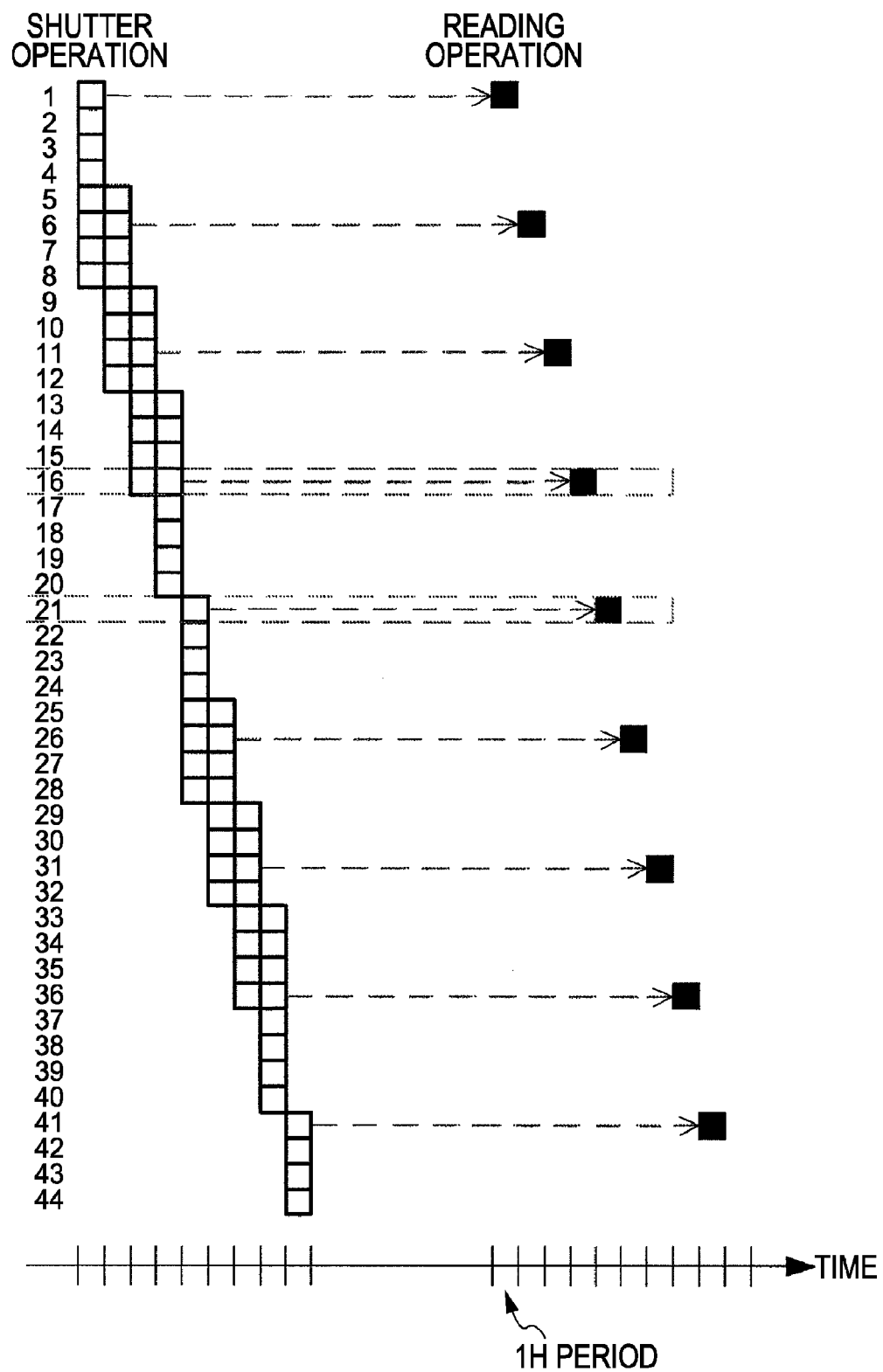
FIG. 4 is a diagram describing a second operation sequence of 1/5 row decimation.

FIG. 4 is a diagram describing a second operation sequence of 1/5 row decimation. When the operation sequence described in the second embodiment is used, a horizontal stripe possibly occurs. However, as shown in FIG. 4, in a sequence including only 8(n−1)-row simultaneous shutter operations (n=2, i.e., eight-row simultaneous shutter operations, since FIG. 4 shows an example of 1/5 row decimation), the difference of the amounts of blooming effects on rows to be read, which are caused by rows adjacent to the rows to be read, can be reduced to a difference corresponding to 0H or 1H among the rows to be read. That is, the amounts of blooming effects on the rows to be read, which are caused by rows adjacent to the rows to be read, can be substantially equalized, and the maximum difference of the amounts of blooming effects is a difference corresponding to 1H.

However, in this sequence, there are two types of rows: rows of one type are rows for each of which a shutter operation, another shutter operation, and a reading operation are performed in this order; and rows of the other type are rows for each of which a shutter operation and a reading operation are performed in this order. Accordingly, a performance variation due to the difference of shutter operations (hereinafter, referred to as a "performance variation of shutter operations") possibly occurs between the two types of rows. For example, referring to FIG. 4, although a shutter operation, another shutter operation, and a reading operation are performed in this order for a sixteenth row, a shutter operation and a reading operation are performed in this order for a twenty-first row. Accordingly, the performance variation of the shutter operations possibly occurs.

In an example of the circuit configuration of a solid-state imaging device according to a third embodiment, referring to the circuit diagram shown in FIG. 2, the unused-pixel-reset signal S1 and the simultaneous-shutter-operation signal S2 for 8(n−1) rows are input to the row-selection circuit 1 to realize the 8(n−1)-row simultaneous shutter operations.

Fourth Embodiment

Figure 5:
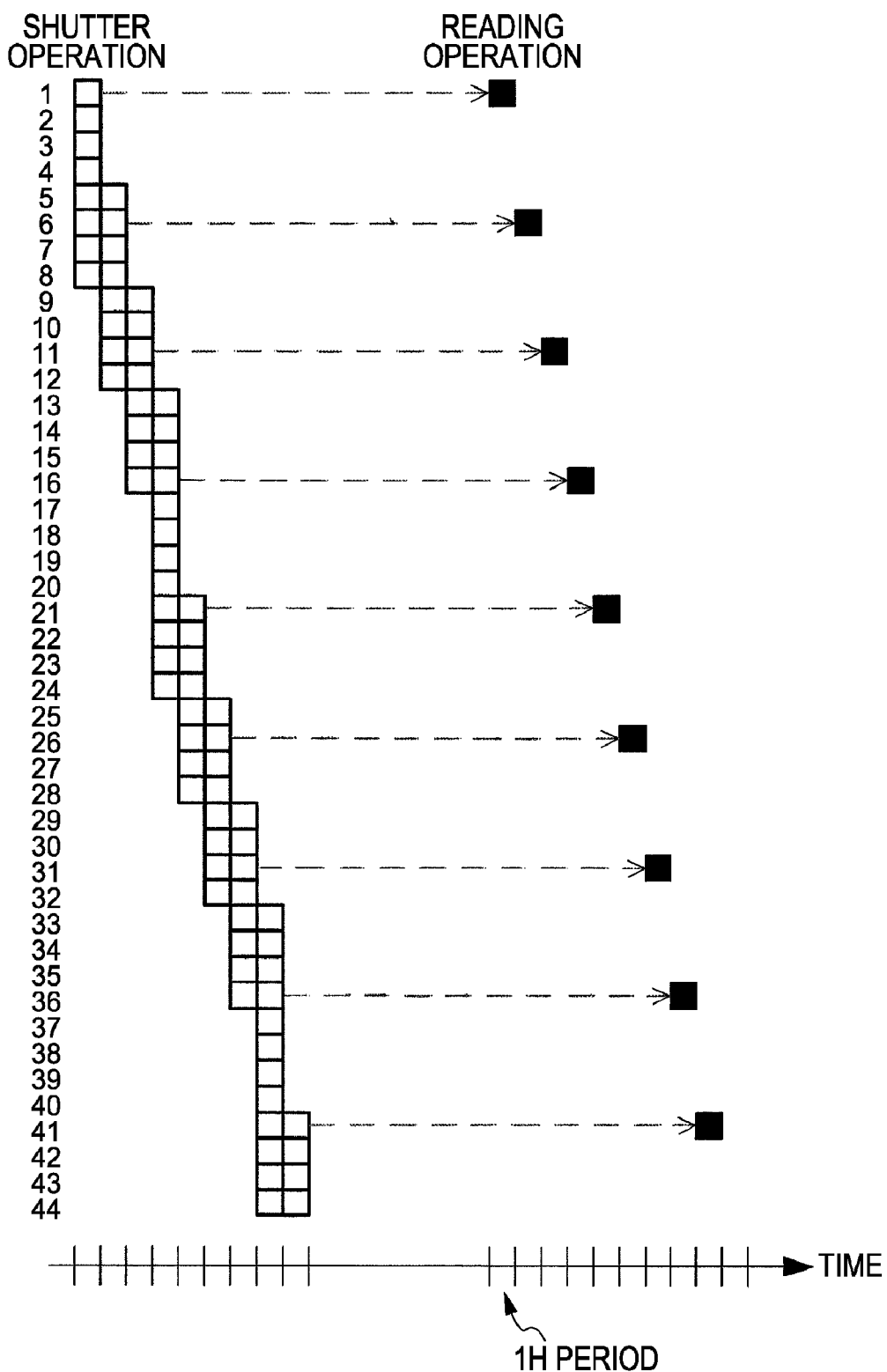
FIG. 5 is a diagram describing a third operation sequence of 1/5 row decimation.

When the sequence described in the third embodiment is used, the performance variation of the shutter operations possibly occurs. However, as shown in FIG. 5, when the combination of 8(n−1)-row simultaneous shutter operations and 12(n−1)-row simultaneous shutter operations (n=2, i.e., eight-row simultaneous shutter operations and twelve-row simultaneous shutter operations, since FIG. 5 shows an example of 1/5 row decimation) is used, a sequence in which a shutter operation, another shutter operation, and a reading operation are performed in this order can be applied to all rows to be read.

This enables target rows to be read to have the substantially equal amounts of blooming effects caused by rows adjacent to the target rows, and the maximum difference of the amounts of blooming effects is a difference corresponding to 1H. Accordingly, the blooming effects can be stably removed in signal processing of a subsequent stage. As a result, the occurrence of a horizontal stripe in an image can be prevented to obtain an excellent image quality.

In an example of the circuit configuration of a solid-state imaging device according to a fourth embodiment, referring to the circuit diagram shown in FIG. 2, the unused-pixel-reset signal S1, a simultaneous-shutter-operation signal for 8(n−1) rows, and a simultaneous-shutter-operation signal for 12(n−1) rows are input to the row-selection circuit 1 to realize the 8(n−1)-row simultaneous shutter operations and the 12(n−1)-row simultaneous shutter operations. Although only one simultaneous-shutter-operation signal S2 is shown in FIG. 2, the above-described two simultaneous-shutter-operation signals are input to the row-selection circuit 1 in the fourth embodiment.

Fifth Embodiment

Figure 6:
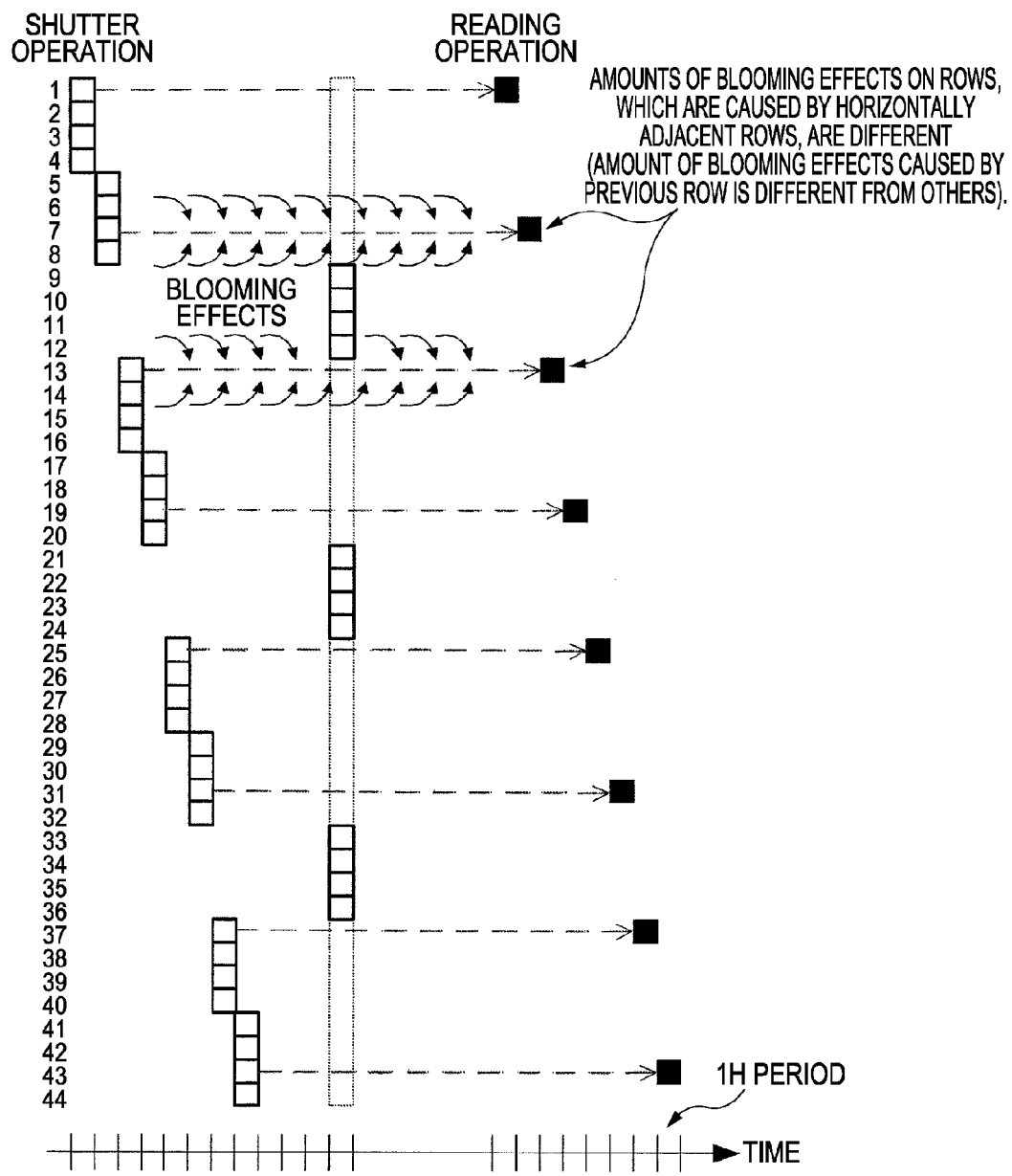
FIG. 6 is a diagram describing a first operation sequence of 1/6 row decimation.

FIG. 6 is a diagram describing an operation sequence of 1/6 row decimation. In a case of 1/(4n−2) row decimation, i.e., 1/6 row decimation, 1/10 row decimation, etc., one row every (4n−2) rows is read. A case of n=1, i.e., 1/2 row decimation, will be described below.

Shutter operations form a pattern for a group of rows whose number is LCM (4n−2, 4(n−1)). In this pattern, 4(n−1)-row simultaneous shutter operations are performed, and one row every (4n−2) rows is read as a reading operation performed concurrently with decimation (FIG. 6 shows an example of 1/6 decimation (n=2)). Shutter operations for 4(n−1) rows not including any rows to be read in one group are simultaneously performed with shutter operations for 4(n−1) rows not including any rows to be read in another group, for example, in a non-selection period (a reading period for pixels that are not used for an image output).

In other words, by using this sequence, the shutter operations can be performed also for the rows to be decimated. However, because of the same reason as in the case of the second embodiment, a horizontal stripe possibly occurs. For this reason, in the case of n=1, i.e., 1/2 row decimation, by using two-row simultaneous shutter operations, the difference of the amounts of blooming effects on rows to be read, which are caused by rows adjacent to the rows to be read, can be reduced to a difference corresponding to 0H.

In an example of the circuit configuration of a solid-state imaging device according to a fifth embodiment, referring to the circuit diagram shown in FIG. 2, the unused-pixel-reset signal S1 and the simultaneous-shutter-operation signal S2 for 4(n−1) rows are input to the row-selection circuit 1 to realize the 4(n−1)-row simultaneous shutter operations.

Sixth Embodiment

Figure 7:
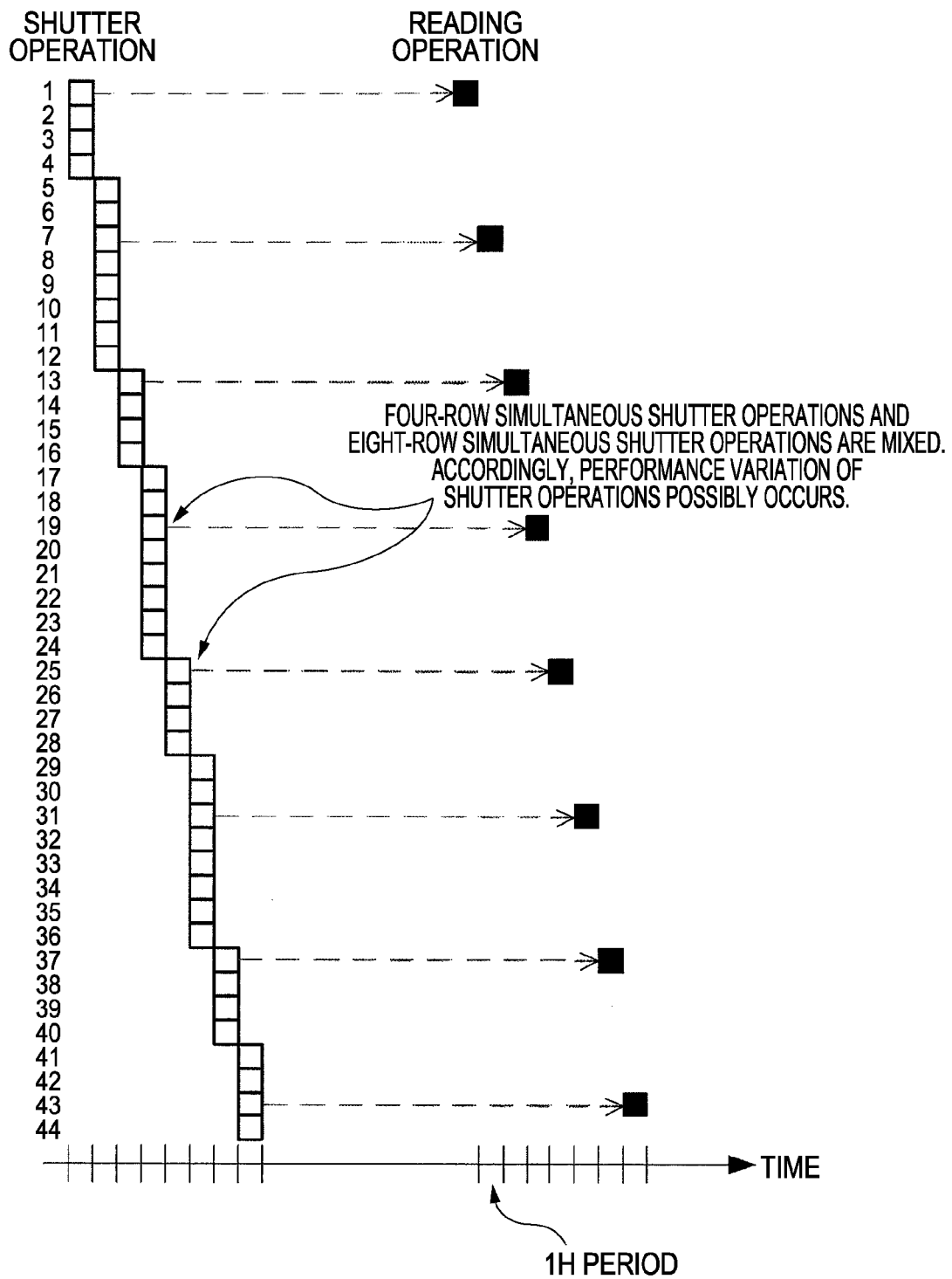
FIG. 7 is a diagram describing a second operation sequence of 1/6 row decimation.

When the sequence described in the fifth embodiment is used, a horizontal stripe possibly occurs. FIG. 7 describes a sequence in which the combination of 8(n−1)-row simultaneous shutter operations and 4(n−1)-row simultaneous shutter operations (FIG. 7 shows an example of 1/6 decimation (n=2), i.e., four-row simultaneous shutter operations and eight-row simultaneous shutter operations) is used, and one row every (4n−2) rows is read as a reading operation performed concurrently with decimation. By using this manner, the difference of the amounts of blooming effects on rows to be read, which are caused by rows adjacent to the rows to be read, can be reduced to a difference corresponding to 0H or 1H among the rows to be read.

However, since the 8(n−1)-row simultaneous shutter operations and the 4(n−1)-row simultaneous shutter operations are mixed in this sequence, a performance variation of the shutter operations occurs between the rows for which the 8(n−1)-row simultaneous shutter operations are performed and the rows for which the 4(n−1)-row simultaneous shutter operations are performed.

In an example of the circuit configuration of a solid-state imaging device according to a sixth embodiment, referring to the circuit diagram shown in FIG. 2, the unused-pixel-reset signal S1, a simultaneous-shutter-operation signal for 8(n−1) rows, and a simultaneous-shutter-operation signal for 4(n−1) rows are input to the row-selection circuit 1 to realize the 8(n−1)-row simultaneous shutter operations and the 4(n−1)-row simultaneous shutter operations. Although only one simultaneous-shutter-operation signal S2 is shown in FIG. 2, the above-described two simultaneous-shutter-operation signals are input to the row-selection circuit 1 in the sixth embodiment.

Seventh Embodiment

Figure 8:
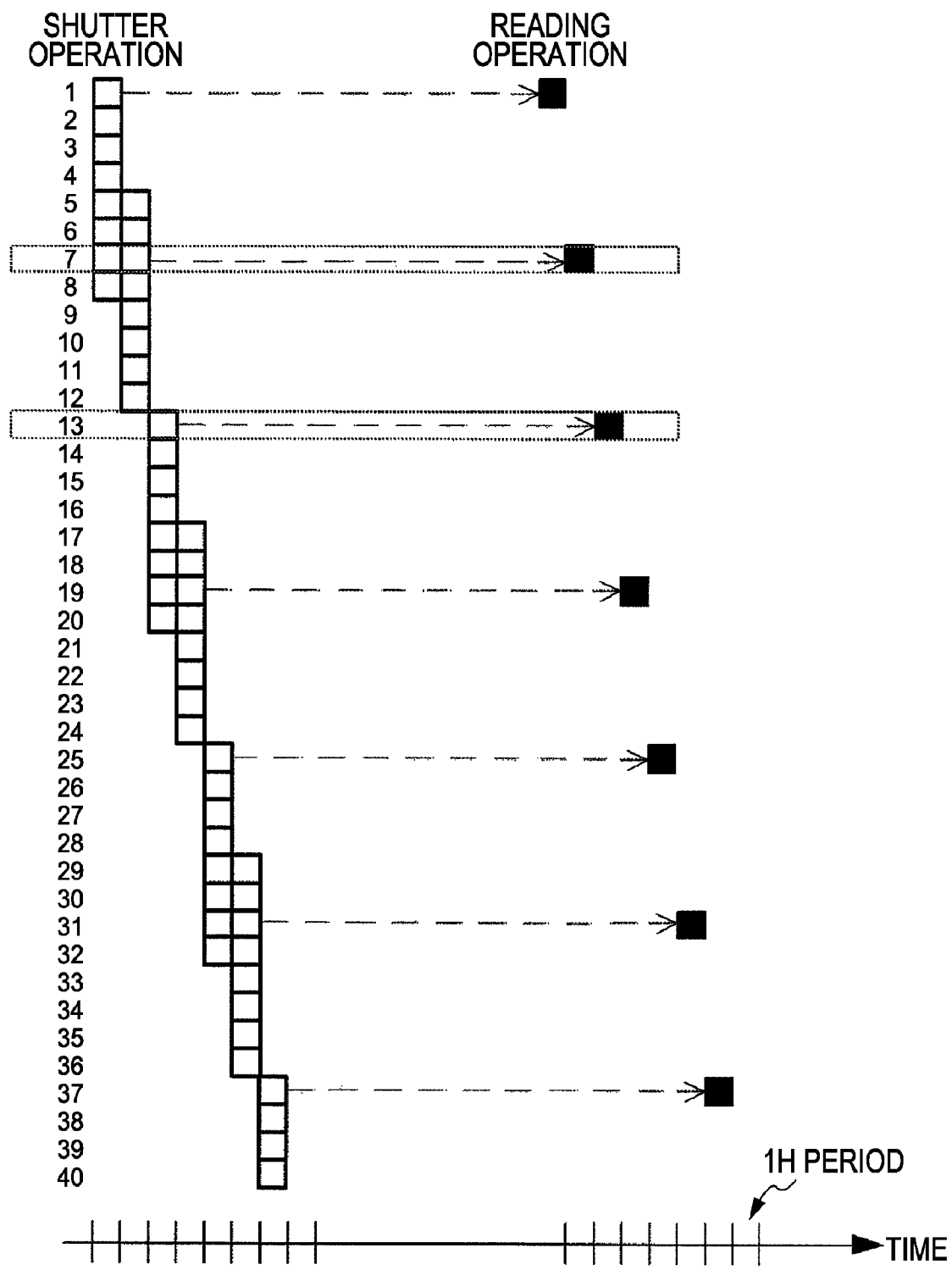
FIG. 8 is a diagram describing a third operation sequence of 1/6 row decimation.

FIG. 8 is a diagram describing a third operation sequence of 1/6 row decimation. When the sequence described in the sixth embodiment is used, a performance variation of the shutter operations possibly occurs. FIG. 8 shows an example of 1/6 row decimation (n=2), and only 8(n−1)-row simultaneous shutter operations are used. Accordingly, there is no possibility that the above-described performance variation of the shutter operations occurs. Furthermore, the difference of the amounts of blooming effects on rows to be read, which are caused by rows adjacent to the rows to be read, can be reduced to a difference corresponding to 0H.

However, in this sequence, there are two types of rows: rows of one type are rows for each of which a shutter operation, another shutter operation, and a reading operation are performed in this order; and rows of the other type are rows for each of which a shutter operation and a reading operation are performed in this order. Accordingly, a performance variation of the shutter operations possibly occurs between the two types of rows. For example, referring to FIG. 8, although a shutter operation, another shutter operation, and a reading operation are performed in this order for a seventh row, a shutter operation and a reading operation are performed in this order for a thirteenth row. Accordingly, the performance variation of the shutter operations possibly occurs.

In an example of the circuit configuration of a solid-state imaging device according to a seventh embodiment, referring to the circuit diagram shown in FIG. 2, the unused-pixel-reset signal S1 and the simultaneous-shutter-operation signal S2 for 8(n−1) rows are input to the row-selection circuit 1 to realize the 8(n−1)-row simultaneous shutter operations.

Eighth Embodiment

Figure 9:
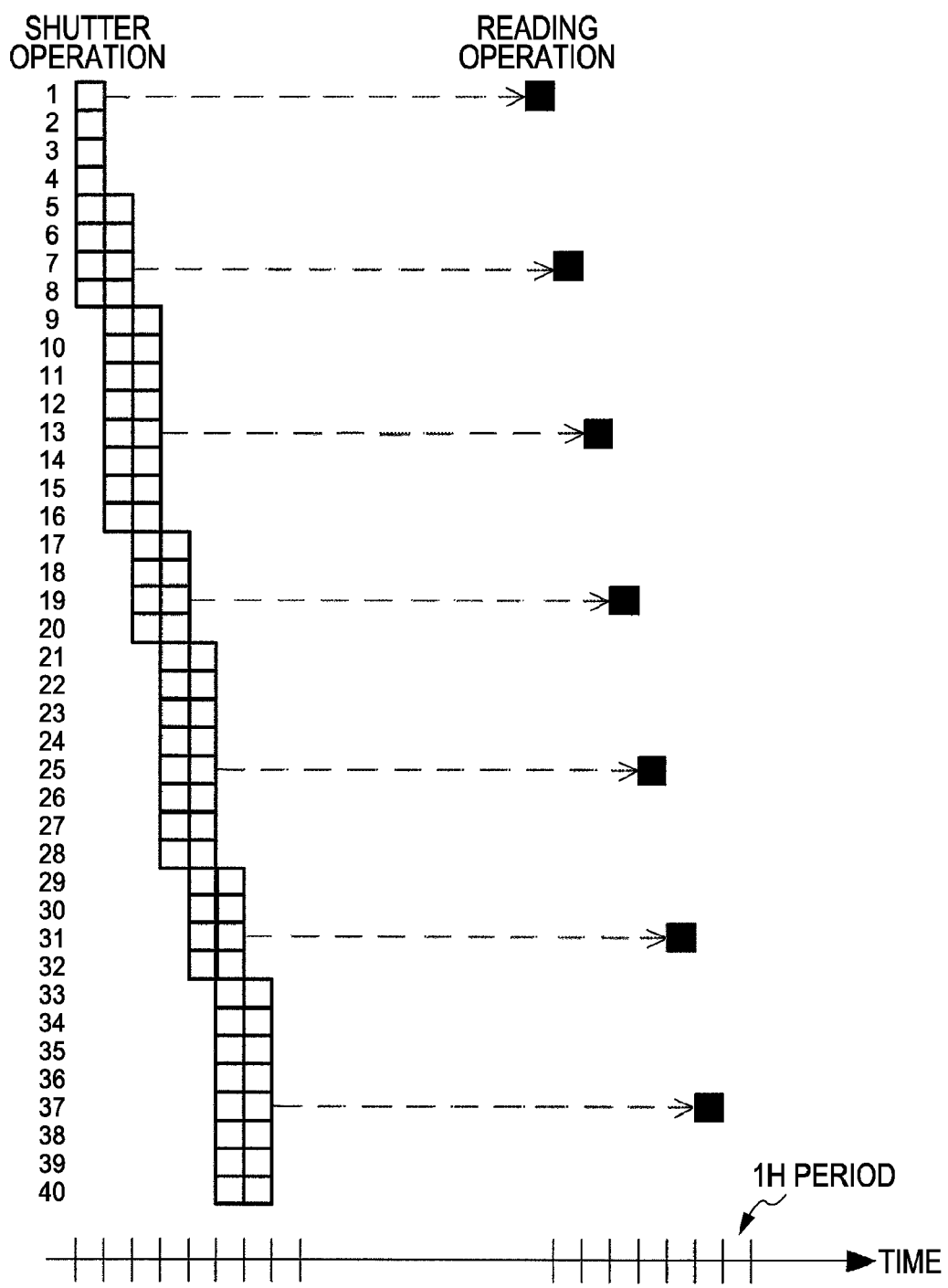
FIG. 9 is a diagram describing a fourth operation sequence of 1/6 row decimation.

FIG. 9 is a diagram describing a fourth operation sequence of 1/6 row decimation. When the sequence described in the seventh embodiment is used, a problem of the performance variation of the shutter operations possibly occurs. FIG. 9 shows an example of 1/6 row decimation (n=2). When only 4(n+1)-row simultaneous shutter operations, i.e., twelve-row simultaneous shutter operations in this example, are used, a sequence in which a shutter operation, another shutter operation, and a reading operation are performed in this order can be applied to all rows to be read. Referring to FIG. 9, although a shutter operation and a reading operation are performed in this order for the top row, this may be insignificant because the order is used only for one row. Additionally, the amounts of blooming effects on rows to be read, which are caused by rows adjacent to the rows to be read, can be substantially equalized, and the maximum difference of the amounts of blooming effects is a difference corresponding to 1H.

In an example of the circuit configuration of a solid-state imaging device according to an eighth embodiment, referring to the circuit diagram shown in FIG. 2, the unused-pixel-reset signal S1 and the simultaneous-shutter-operation signal S2 for 4(n+1) rows are input to the row-selection circuit 1 to realize the 4(n+1)-row simultaneous shutter operations.

Ninth Embodiment

Figure 10:
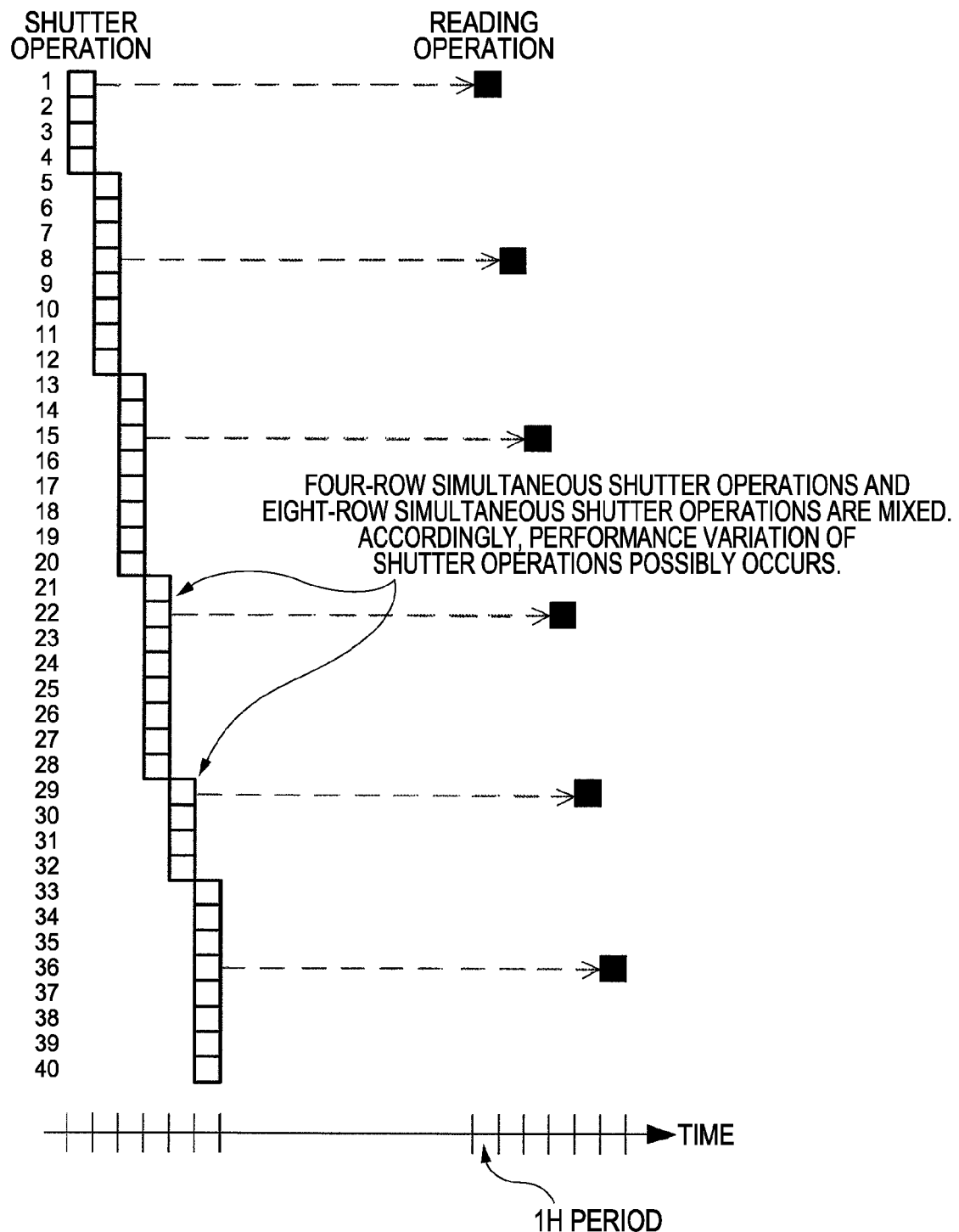
FIG. 10 is a diagram describing a first operation sequence of 1/7 row decimation.

FIG. 10 is a diagram describing a first operation sequence of 1/7 decimation. In a case of 1/(4n−1) row decimation, i.e., 1/3 row decimation, 1/7 row decimation, 1/11 row decimation, etc., one row every (4n−1) rows is read. Shutter operations form a pattern for a group of rows whose number is LCM (4n−1, 2n). The combination of 4(n−1)-row simultaneous shutter operations and 4n-row simultaneous shutter operations is used, and one row every (4n−1) rows is read as a reading operation performed concurrently with decimation.

FIG. 10 shows an example of 1/7 decimation (n=2, i.e., 4-row simultaneous shutter operations and 8-row simultaneous shutter operations. The difference of the amounts of blooming effects on rows to be read, which are caused by rows adjacent to the rows to be read, can be reduced to a difference corresponding to 0H or 1H among the rows to be read.

However, since the 4(n−1)-row simultaneous shutter operations and the 4n-row simultaneous shutter operations are mixed in this sequence, a performance variation of the shutter operations occurs between the rows for which the 4(n−1)-row simultaneous shutter operations are performed and the rows for which the 4n-row simultaneous shutter operations are performed.

In an example of the circuit configuration of a solid-state imaging device according to a ninth embodiment, referring to the circuit diagram shown in FIG. 2, the unused-pixel-reset signal S1, a simultaneous-shutter-operation signal for 4(n−1) rows, and a simultaneous-shutter-operation signal for 4n rows are input to the row-selection circuit 1 to realize the 4(n−1)-row simultaneous shutter operations and the 4n-row simultaneous shutter operations. Although only one simultaneous-shutter-operation signal S2 is shown in FIG. 2, the above-described two simultaneous-shutter-operation signals are input to the row-selection circuit 1 in the ninth embodiment.

Tenth Embodiment

Figure 11:
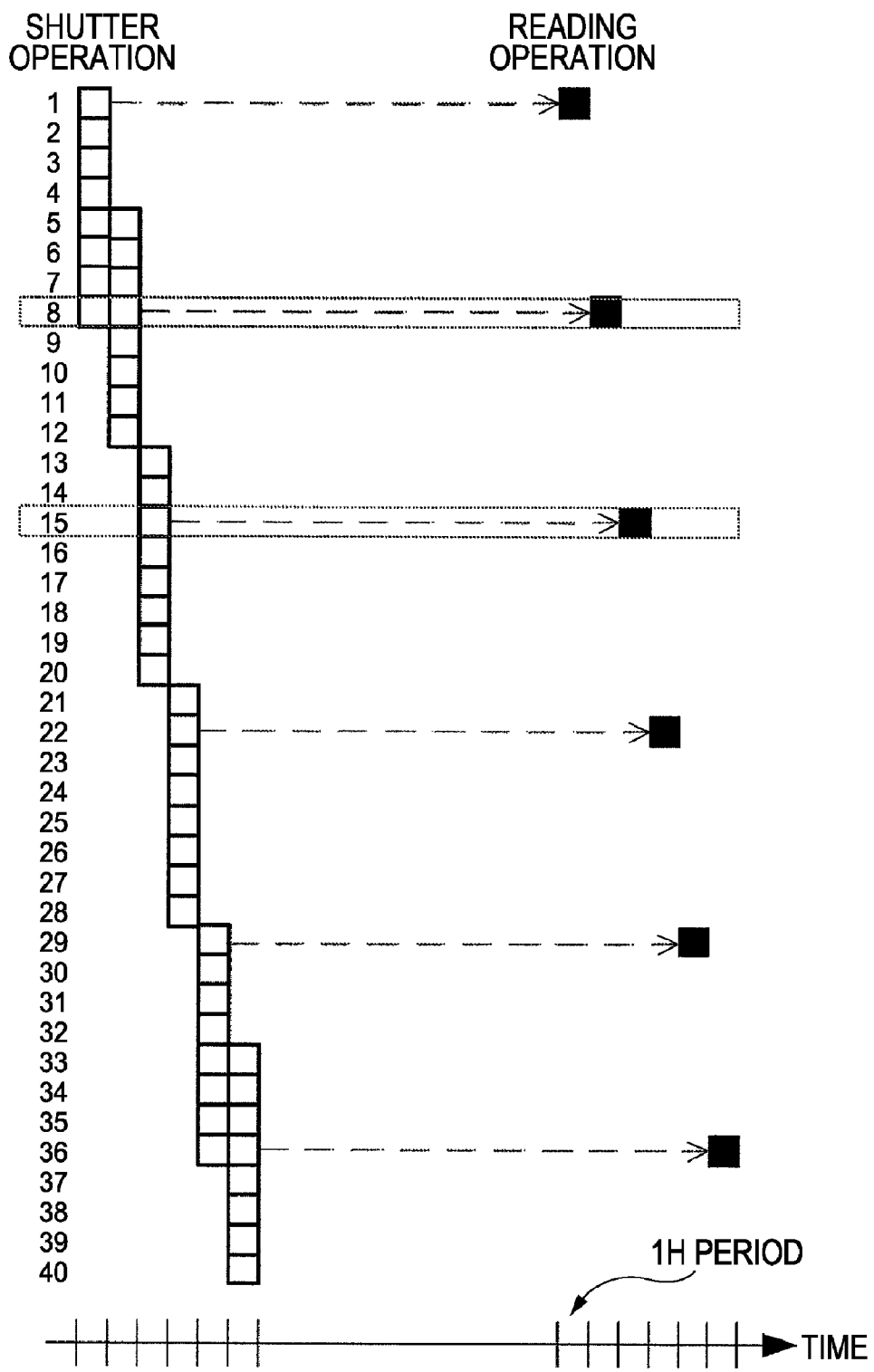
FIG. 11 is a diagram describing a second operation sequence of 1/7 row decimation.

FIG. 11 is a diagram describing a second operation sequence of 1/7 decimation. When the sequence described in the ninth embodiment is used, a problem of the performance variation of the shutter operations possibly occurs. FIG. 11 shows an example of 1/7 decimation (n=2). When only 4n-row simultaneous shutter operations, i.e., only eight-row simultaneous shutter operations in this example, are used, there is no possibility that the above-described performance variation of the shutter operations occurs. Furthermore, The difference of the amounts of blooming effects on rows to be read, which are caused by rows adjacent to the rows to be read, can be reduced to a difference corresponding to 0H or 1H.

However, in this sequence, there are two types of rows: rows of one type are rows for each of which a shutter operation, another shutter operation, and a reading operation are performed in this order; and rows of the other type are rows for each of which a shutter operation and a reading operation are performed in this order. Accordingly, a performance variation of the shutter operations possibly occurs between the two types of rows. For example, referring to FIG. 11, although a shutter operation, another shutter operation, and a reading operation are performed in this order for an eighth row, a shutter operation and a reading operation are performed in this order for a fifteenth row. Accordingly, a performance variation of the shutter operations possibly occurs.

In an example of the circuit configuration of a solid-state imaging device according to a tenth embodiment, referring to the circuit diagram shown in FIG. 2, the unused-pixel-reset signal S1 and the simultaneous-shutter-operation signal S2 for 4n rows are input to the row-selection circuit 1 to realize the 4n-row simultaneous shutter operations.

Eleventh Embodiment

Figure 12:
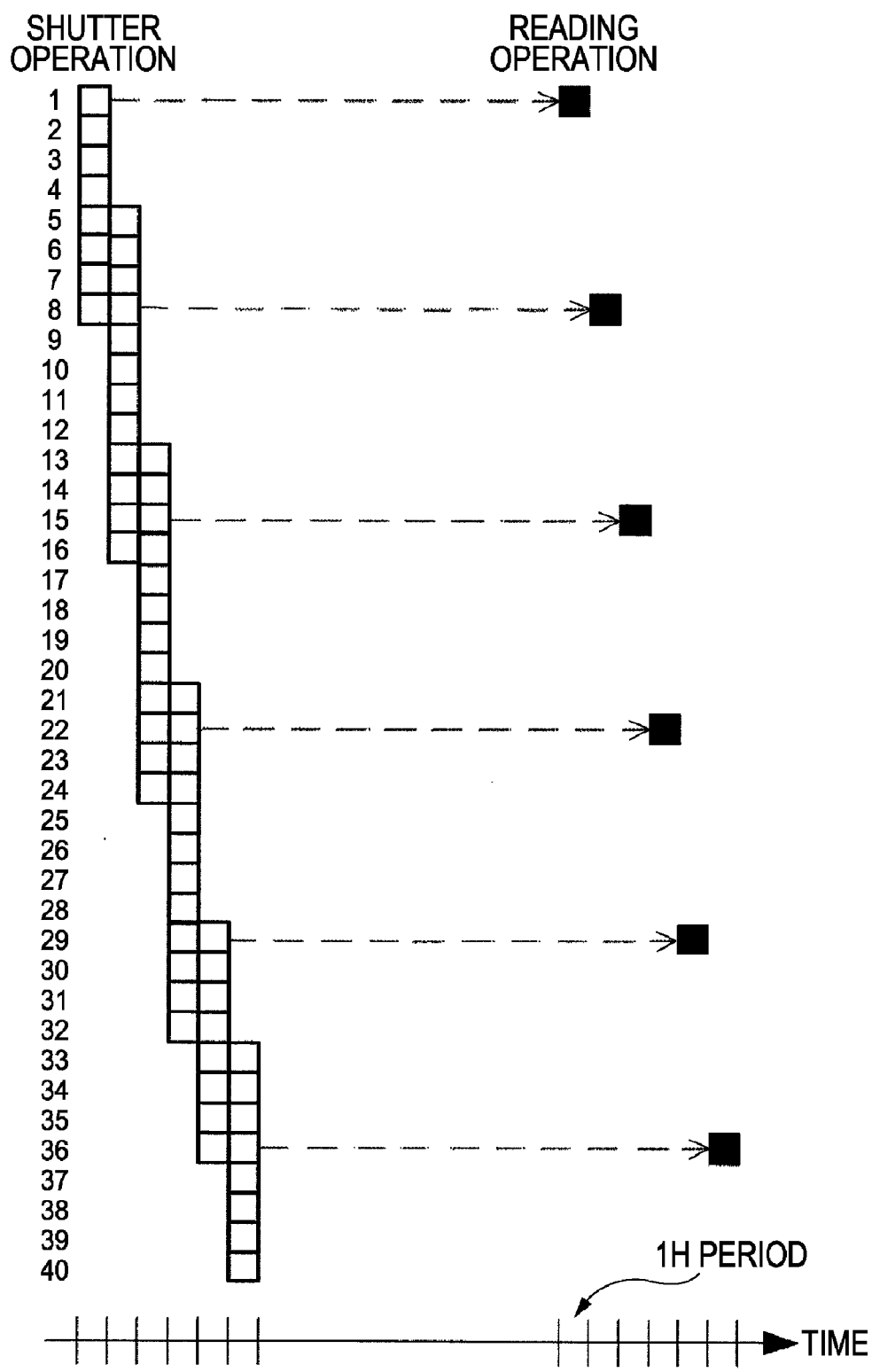
FIG. 12 is a diagram describing a third operation sequence of 1/7 row decimation.
Figure 13:
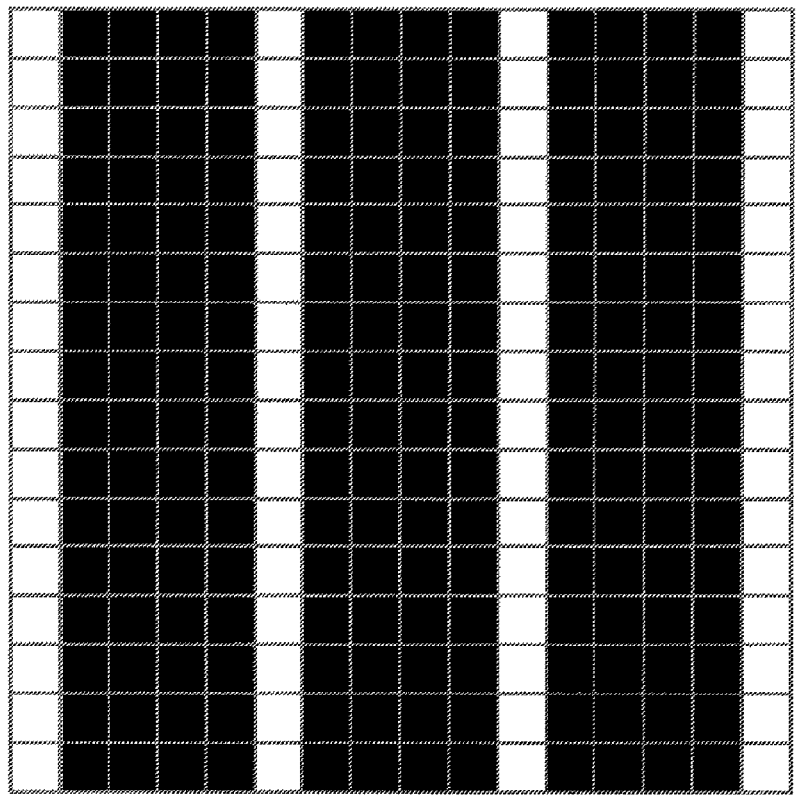
FIG. 13 is a schematic diagram describing a 1/5 row decimation operation.

FIG. 12 is a diagram describing a third operation sequence of 1/7 decimation. When the sequence described in the tenth embodiment is used, the performance variation of the shutter operations problem possibly occurs. FIG. 12 shows an example of 1/7 row decimation (n=2). When the combination of 4n-row simultaneous shutter operations and 2n-row simultaneous shutter operations, i.e., eight-row simultaneous shutter operations and twelve-row simultaneous shutter operations in this example, is used, a sequence in which a shutter operation, another shutter operation, and a reading operation are performed in this order can be applied to all rows to be read. Referring to FIG. 12, although a shutter operation and a reading operation are performed in this order for the top row, this may be insignificant because the order is used only for one row. Additionally, the amounts of blooming effects on rows to be read, which are caused by rows adjacent to the rows to be read, can be substantially equalized, and the maximum difference of the amounts of blooming effects is a difference corresponding to 1H.

In an example of the circuit configuration of a solid-state imaging device according to an eleventh embodiment, referring to the circuit diagram shown in FIG. 2, the unused-pixel-reset signal S1, a simultaneous-shutter-operation signal for 4n rows, and a simultaneous-shutter-operation signal for 2n rows are input to the row-selection circuit 1 to realize the 4n-row simultaneous shutter operations and the 2n-row simultaneous shutter operations. Although only one simultaneous-shutter-operation signal S2 is shown in FIG. 2, the above-described two simultaneous-shutter-operation signals are input to the row-selection circuit 1 in the eleventh embodiment.

The solid-state image devices according to the embodiments of the present invention described above have advantages described below. That is, in CMOS image sensors that have been developed recently, while the increase of the number of pixels is strongly demanded, high-speed imaging, which is not realized in charge-coupled device (CCD) image sensors, is also highly expected. In such a situation, the technological significance of decimation operations for realizing devices allowing CMOS image sensors with a large number of pixels to be performed at high speed is markedly high. Additionally, it is expected that transistor-sharing pixels will be further employed in the near feature in view of, for example, the increase of aperture ratio. The solid-state imaging devices according to the embodiments of the present invention have an advantage in that the influence of blooming effects can be markedly reduced in a case where a decimation operation is performed, thereby largely contributing to the realization of a high-quality image. Furthermore, the number of rows to be decimated can be selected with flexibility even when transistor-sharing pixels are used, whereby a large advantage can be also expected.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a sharing pixel block including k pixel transistors, where k is a natural number other than 1, corresponding to n pixels, where n is a natural number other than 1; and
a row-selection circuit configured to select the pixel transistors for every row in the sharing pixel block using logic of an address signal and a timing signal,
wherein,
when a 1/n row decimation operation in which a signal is read every n rows, the row-selection circuit simultaneously performs shutter operations for n rows corresponding to the k pixel transistors included in the sharing pixel block using an input of a simultaneous-shutter-operation signal, and
row decimation is based on two control signals, one of which is an unused-pixel-reset signal and the other of which is the simultaneous-shutter-operation signal.

2. The solid-state imaging device according to claim 1, wherein the shutter operations to be simultaneously performed for signals obtained from rows to be decimated in the decimation operation are simultaneously performed in a reading period for pixels that are not used for an image output.

3. A solid-state imaging device comprising:
a sharing pixel block including k pixel transistors, where k is a natural number other than 1, corresponding to 4n pixels, where n is a natural number; and
a row-selection circuit configured to select the pixel transistors for every row in the sharing pixel block using logic of an address signal and a timing signal,
wherein,
when a 1/4n row decimation operation in which a signal is read every 4n rows, the row-selection circuit simultaneously performs shutter operations for 4n rows corresponding to the k pixel transistors included in the sharing pixel block using an input of a simultaneous-shutter-operation signal, and
row decimation is based on two control signals, one of which is an unused-pixel-reset signal and the other of which is the simultaneous-shutter operation signal.

4. A solid-state imaging device comprising:
a sharing pixel block including k pixel transistors, where k is a natural number other than 1, corresponding to 4(n−1) pixels, where n is a natural number other than 1; and
a row-selection circuit configured to select the pixel transistors for every row in the sharing pixel block using logic of an address signal and a timing signal,
wherein,
when a 1/(4n−3) row decimation operation in which a signal is read every (4n−3) rows, the row-selection circuit simultaneously performs shutter operations for 4(n−1) rows corresponding to the k pixel transistors included in the sharing pixel block using an input of a simultaneous-shutter-operation signal, and
row decimation is based on decoding of two control signals, one of which is an unused-pixel-reset signal and the other of which is the simultaneous-shutter operation signal.

5. A solid-state imaging device comprising:
a sharing pixel block including k pixel transistors, where k is a natural number other than 1, corresponding to 4(n−1) pixels, where n is a natural number other than 1; and
a row-selection circuit configured to select the pixel transistors for every row in the sharing pixel block using logic of an address signal and a timing signal,
wherein,
when a 1/(4n−3) row decimation operation in which a signal is read every (4n−3) rows, the row-selection circuit simultaneously performs shutter operations for 8(n−1) rows corresponding to 2k pixel transistors corresponding to two sharing pixel blocks using an input of a simultaneous-shutter-operation signal, and
row decimation is based on decoding of two control signals, one of which is an unused-pixel-reset signal and the other of which is the simultaneous-shutter operation signal.

6. A solid-state imaging device comprising:
a sharing pixel block including k pixel transistors, where k is a natural number other than 1, corresponding to 4(n−1) pixels, where n is a natural number other than 1; and
a row-selection circuit configured to select the pixel transistors for every row in the sharing pixel block using logic of an address signal and a timing signal,
wherein,
when a 1/(4n−3) row decimation operation in which a signal is read every (4n−3) rows, the row-selection circuit simultaneously performs shutter operations for 12(n−1) rows corresponding to 3k pixel transistors corresponding to three sharing pixel blocks using an input of a simultaneous-shutter-operation signal, and
row decimation is based on decoding of two control signals, one of which is an unused-pixel-reset signal and the other of which is the simultaneous-shutter operation signal.

7. A solid-state imaging device comprising:
a sharing pixel block including k pixel transistors, where k is a natural number other than 1, corresponding to 4(n−1) pixels, where n is a natural number other than 1; and
a row-selection circuit configured to select the pixel transistors for every row in the sharing pixel block using logic of an address signal and a timing signal,
wherein,
when a 1/(4n−2) row decimation operation in which a signal is read every (4n−2) rows, the row-selection circuit simultaneously performs shutter operations for 4(n−1) rows corresponding to the k pixel transistors included in the sharing pixel block using an input of a simultaneous-shutter-operation signal, and
row decimation is based on two control signals, one of which is an unused-pixel-reset signal and the other of which is the simultaneous-shutter operation signal.

8. A solid-state imaging device comprising:
a sharing pixel block including k pixel transistors, where k is a natural number other than 1, corresponding to 8(n−1) pixels, where n is a natural number other than 1; and
a row-selection circuit configured to select the pixel transistors for every row in the sharing pixel block using logic of an address signal and a timing signal,
wherein,
when a 1/(4n−2) row decimation operation in which a signal is read every (4n−2) rows, the row-selection circuit simultaneously performs shutter operations for 8(n−1) rows corresponding to the k pixel transistors included in the sharing pixel block using an input of a simultaneous-shutter-operation signal, and
row decimation is based on two control signals, one of which is an unused-pixel-reset signal and the other of which is the simultaneous-shutter operation signal.

9. A solid-state imaging device comprising:
a sharing pixel block including k pixel transistors, where k is a natural number other than 1, corresponding to 4(n+1) pixels, where n is a natural number other than 1; and
a row-selection circuit configured to select the pixel transistors for every row in the sharing pixel block using logic of an address signal and a timing signal,
wherein,
when a 1/(4n−2) row decimation operation in which a signal is read every (4n−2) rows, the row-selection circuit simultaneously performs shutter operations for 4(n+1) rows corresponding to the k pixel transistors included in the sharing pixel block using an input of a simultaneous-shutter-operation signal, and
row decimation is based on two control signals, one of which is an unused-pixel-reset signal and the other of which is the simultaneous-shutter operation signal.

10. A solid-state imaging device comprising:
a sharing pixel block including k pixel transistors, where k is a natural number other than 1, corresponding to 4(n−1) pixels, where n is a natural number other than 1; and
a row-selection circuit configured to select the pixel transistors for every row in the sharing pixel block using logic of an address signal and a timing signal,
wherein,
when a 1/(4n−1) row decimation operation in which a signal is read every (4n−1) rows, the row-selection circuit simultaneously performs shutter operations for 4(n−1) rows corresponding to the k pixel transistors included in the sharing pixel block using an input of a simultaneous-shutter-operation signal, and row decimation is based on two control signals, one of which is an unused-pixel-reset signal and the other of which is the simultaneous-shutter operation signal.

11. A solid-state imaging device comprising:

a sharing pixel block including k pixel transistors, where k is a natural number other than 1, corresponding to 8(n−1) pixels, where n is a natural number other than 1; and a row-selection circuit configured to select the pixel transistors for every row in the sharing pixel block using logic of an address signal and a timing signal, wherein, when a 1/(4n−1) row decimation operation in which a signal is read every (4n−1) rows, the row-selection circuit simultaneously performs shutter operations for 8(n−1) rows corresponding to the k pixel transistors included in the sharing pixel block using an input of a simultaneous-shutter-operation signal, and row decimation is based on two control signals, one of which is an unused-pixel-reset signal and the other of which is the simultaneous-shutter operation signal.

12. A solid-state imaging device comprising:

a sharing pixel block including k pixel transistors, where k is a natural number other than 1, corresponding to 4(n+1) pixels, where n is a natural number other than 1; and a row-selection circuit configured to select the pixel transistors for every row in the sharing pixel block using logic of an address signal and a timing signal, wherein, when a 1/(4n−1) row decimation operation in which a signal is read every (4n−1) rows, the row-selection circuit simultaneously performs shutter operations for 4(n+1) rows corresponding to the k pixel transistors included in the sharing pixel block using an input of a simultaneous-shutter-operation signal, and row decimation is based on two control signals, one of which is an unused-pixel-reset signal and the other of which is the simultaneous-shutter operation signal.

* * * * *